United States Patent
Ko et al.

(10) Patent No.: US 9,538,370 B2
(45) Date of Patent: Jan. 3, 2017

(54) DATA TRANSMISSION METHOD FOR TERMINAL PERFORMING NEAR FIELD COMMUNICATION AND TERMINAL THEREOF

(71) Applicant: Samsung Electronics Co., Ltd., Suwon-si (KR)

(72) Inventors: Jae-woo Ko, Uiwang-si (KR); Tae-hwan Wi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 206 days.

(21) Appl. No.: 13/975,544

(22) Filed: Aug. 26, 2013

(65) Prior Publication Data

US 2014/0057561 A1  Feb. 27, 2014

(30) Foreign Application Priority Data

Aug. 24, 2012 (KR) .................. 10-2012-0093247

(51) Int. Cl.
| | |
|---|---|
| H04W 12/02 | (2009.01) |
| H04B 5/00 | (2006.01) |
| H04W 4/00 | (2009.01) |
| G06F 3/048 | (2013.01) |
| H04M 1/725 | (2006.01) |
| H04W 12/06 | (2009.01) |
| H04L 29/06 | (2006.01) |

(52) U.S. Cl.
CPC .............. *H04W 12/02* (2013.01); *G06F 3/048* (2013.01); *H04B 5/0031* (2013.01); *H04M 1/7253* (2013.01); *H04W 4/008* (2013.01); *H04W 12/06* (2013.01); *H04L 63/0861* (2013.01); *H04L 63/108* (2013.01); *H04M 2250/04* (2013.01); *H04M 2250/12* (2013.01)

(58) Field of Classification Search
None
See application file for complete search history.

(56) References Cited

U.S. PATENT DOCUMENTS

| | | | |
|---|---|---|---|
| 2008/0195735 A1 | 8/2008 | Hodges et al. | |
| 2009/0144161 A1* | 6/2009 | Fisher | 705/16 |
| 2011/0081923 A1 | 4/2011 | Forutanpour et al. | |
| 2011/0246196 A1* | 10/2011 | Bhaskaran | 704/235 |
| 2011/0313922 A1* | 12/2011 | Ben Ayed | 705/42 |
| 2012/0139831 A1* | 6/2012 | Hou | G06F 3/0233 345/156 |
| 2012/0252359 A1* | 10/2012 | Adams et al. | 455/41.1 |
| 2014/0024309 A1* | 1/2014 | Narendra et al. | 455/41.1 |

FOREIGN PATENT DOCUMENTS

KR   10-2009-0000060 A   1/2009

OTHER PUBLICATIONS

Communication dated Jun. 6, 2014 issued by the European Patent Office in counterpart European Patent Application No. 13181554.0.

* cited by examiner

*Primary Examiner* — Ping Hsieh
*Assistant Examiner* — James Yang
(74) *Attorney, Agent, or Firm* — Sughrue Mion, PLLC

(57) ABSTRACT

Provided are a method of transmitting data from a terminal through near field communication (NFC) according to information input to the terminal, and a terminal thereof. The method includes detecting a user interaction input to the terminal, determining data mapped to the detected user interaction; and transmitting the data mapped to the user interaction to the other device through the NFC.

17 Claims, 10 Drawing Sheets

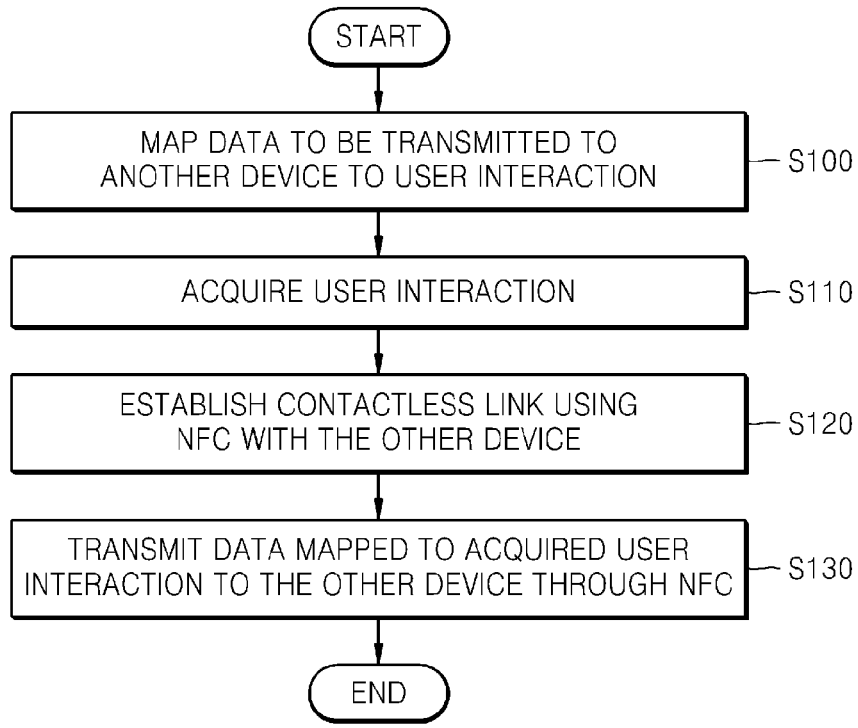
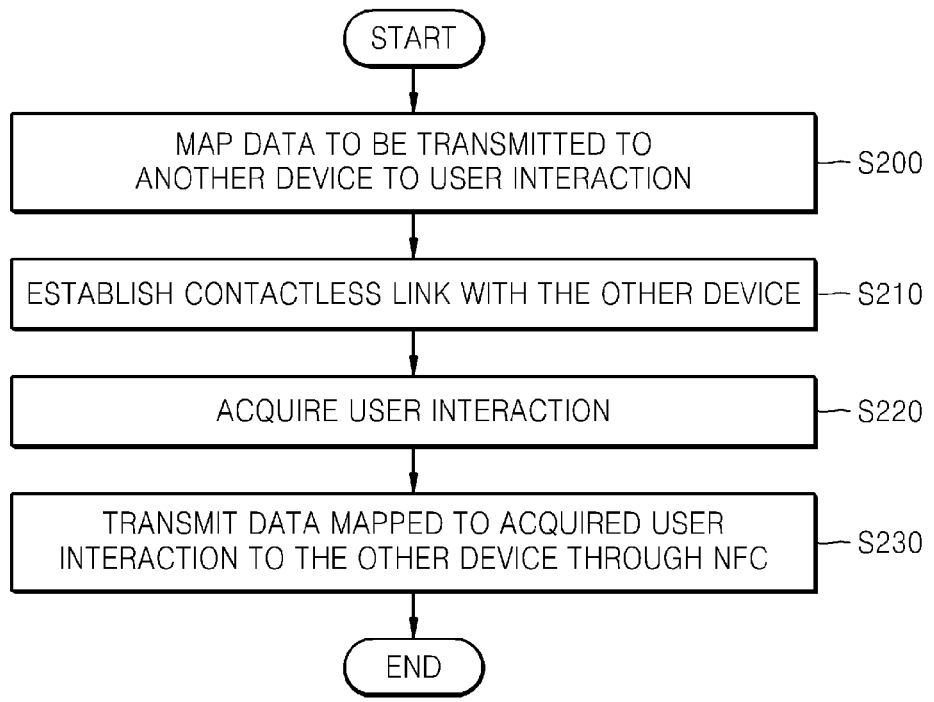

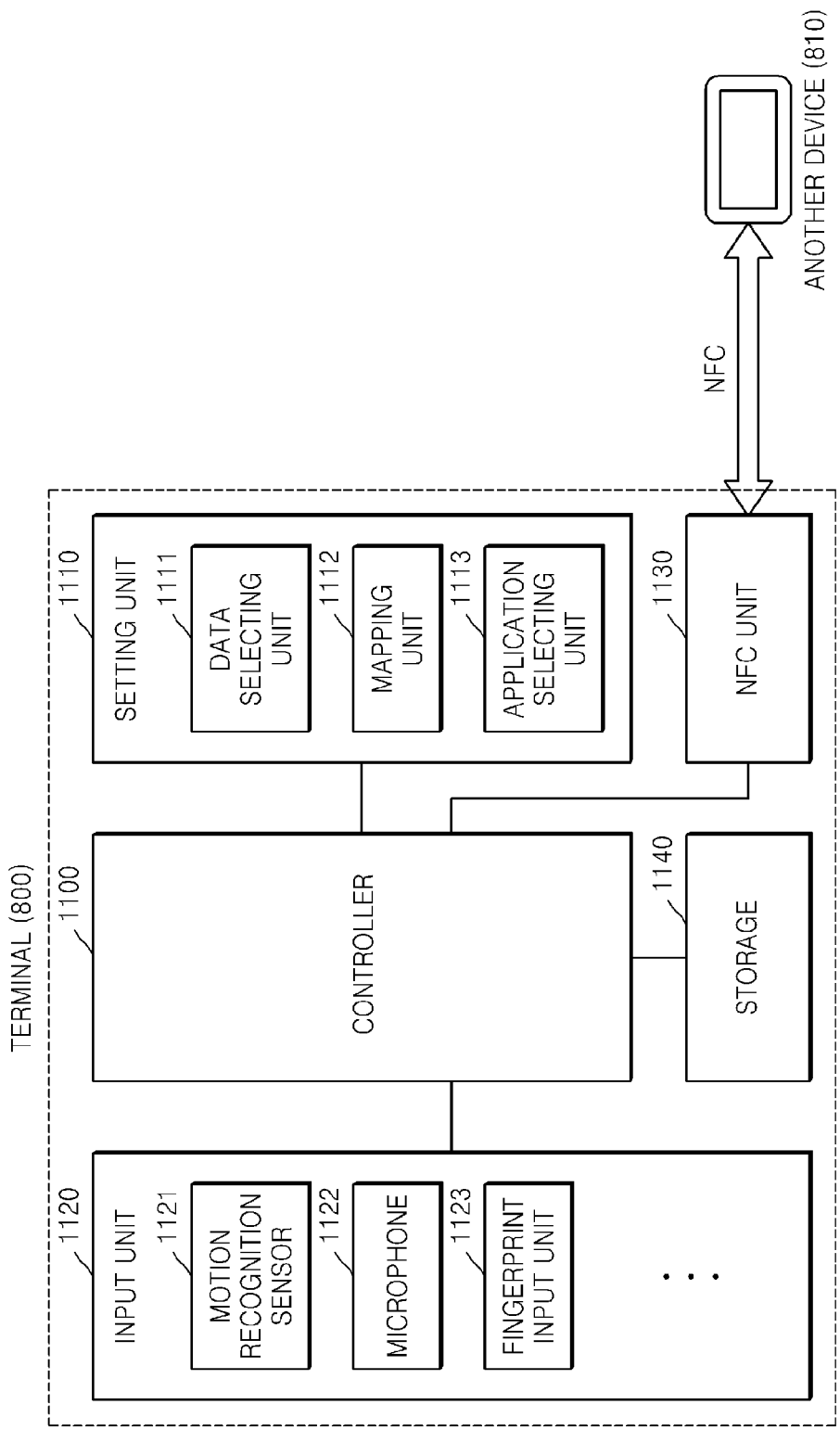

DATA TRANSMISSION METHOD FOR TERMINAL PERFORMING NEAR FIELD COMMUNICATION AND TERMINAL THEREOF

CROSS-REFERENCE TO RELATED PATENT APPLICATION

This application claims priority from Korean Patent Application No. 10-2012-0093247, filed on Aug. 24, 2012, in the Korean Intellectual Property Office, the disclosure of which is incorporated herein in its entirety by reference.

BACKGROUND

1. Field

Apparatuses and methods consistent with exemplary embodiments relate to control methods for terminals performing near field communication (NFC) with other devices and terminals thereof, and more particularly, to data transmission methods for terminals transmitting data to other devices through NFC according to a user input and terminals thereof.

2. Description of the Related Art

In general, near field communication (NFC) is a technology for allowing terminals including personal computers (PCs) and mobile communication terminals such as, for example, portable phones, personal communication service (PCS) terminals, personal digital assistant (PDA) terminals, and notebook computers to perform wireless communication with other devices within a short distance. The NFC may be used for data communication between near field devices, which perform functions such as, for example, a payment service and an electronic key.

To perform the NFC, a terminal uses an NFC device having various operation modes. The various operation modes may include a card emulation mode and a reader mode.

In the card emulation mode, the NFC device may be manually operated to receive data by demodulating data from a magnetic field emitted from another reader device and transmit data to another reader device by modulating the impedance of an antenna circuit into a charge. In the reader mode, the NFC device may transmit data by modulating a magnetic field and receive data according to the transmitted data.

In general, a terminal using the NFC device may perform a plurality of services through the NFC. The terminal may transmit data according to a service to be performed among the plurality of services. For example, to perform a payment service, the terminal may transmit information about a credit card payment means through the NFC. As another example, the terminal may transmit an electronic key desired by a user, among electronic keys for a home, an office, a car, or the like, through the NFC. However, to transmit data according to the service to be performed, among the plurality of services, through the NFC, the user needs to execute an application installed in the terminal and select corresponding data, e.g., a payment means to be transmitted.

Therefore, it is important to transmit only data necessary for a service desired by the user, among the plurality of services, by reflecting a user's intention. Also, it is important to select data to be transmitted to the reader device through the NFC without requesting the user to select an application and transmit corresponding data each time the user uses a service based on the NFC.

SUMMARY

Exemplary embodiments may address at least the above problems and/or disadvantages and other disadvantages not described above. Also, the exemplary embodiments are not required to overcome the disadvantages described above, and an exemplary embodiment may not overcome any of the problems described above.

One or more exemplary embodiments provide data transmission methods for terminals capable of transmitting data corresponding to a user interaction through near field communication (NFC), and terminals thereof.

One or more exemplary embodiments also provide data transmission methods for terminals capable of transmitting data more securely by transmitting data corresponding to only a predetermined user interaction, and terminals thereof.

According to an aspect of an exemplary embodiment, there is provided a method of transmitting data in a terminal capable of near field communication (NFC), the method including: detecting a user interaction input to the terminal; determining data mapped to the detected user interface; and transmitting the data mapped to the detected user interaction to another device through the NFC.

The method may further include storing a time that is set for transmission of the data mapped to the detected user interaction, wherein the transmitting may include transmitting the data mapped to the detected user interaction to the other device through the NFC when a contactless link is established between the terminal and the other device using the NFC within the set time from a time point when the user interaction is detected.

The user interaction may include information about a motion of a user recognized through a motion recognition sensor of the terminal.

The user interaction may include information about a fingerprint of a user input to the terminal.

The user interaction may include a voice of a user input to the terminal.

The determining may include generating a text through voice recognition of the voice of the user input to the terminal and determining data mapped to the generated text.

The method may further include: selecting an application for processing the data; and mapping the data to the detected user interaction to be transmitted to the other device according to the selected application.

The method may further include, prior to the determining: selecting a user interaction type of a user interaction and mapping the user interaction to the data when the user interaction corresponds to the selected user interaction type.

The method may further include storing a record of transmission of the data mapped to the detected user interaction to the other device through the NFC within a predetermined time from a time point when the user interaction is detected, wherein the determining comprises determining the data mapped to the detected user interaction based on the stored record.

The method may further include transmitting information about the user interaction to the other device.

According to an aspect of another exemplary embodiment, there is provided a terminal including: an input unit configured to receive a user interaction input to the terminal; a near field communication (NFC) unit configured to perform near field communication (NFC) with another device; and a controller configured to detect the input user interaction and control the NFC unit to transmit data mapped to the detected user interaction to the other device through the NFC.

The controller may control the NFC unit to transmit the data mapped to the detected user interaction to the other device through the NFC when a contactless link is established between the terminal and the other device using the NFC within a set time from a time point when the user interaction is detected.

The input unit may include a motion recognition sensor, and the user interaction may include a user interaction input through the motion recognition sensor of the terminal.

The input unit may include a fingerprint recognition sensor, and the user interaction may include a fingerprint of a user input through the fingerprint recognition sensor.

The input unit may include a microphone for voice recognition, and the user interaction may include voice information of a user input through the microphone.

The input unit may generate a text through voice recognition of the voice information of the user input to the terminal and the controller may transmit data mapped to the generated text to the other device.

The terminal may further include a setting unit including: an application selecting unit configured to select an application for processing the data; and a mapping unit configured to map the data to the detected user interaction to be transmitted to the other device according to the selected application.

The mapping unit may select a user interaction type of a user interaction and map the user interaction to the data when the user interaction corresponds to the selected user interaction type.

The NFC unit may transmit the user interaction, together with the data, to the other device through the NFC.

The terminal may further include a storage configured to store a record of transmission of the data mapped to the detected user interaction to the other device through the NFC within a predetermined time from a time point when the user interaction is detected, and the setting unit may map the data to the detected user interaction based on the cumulatively-stored record.

BRIEF DESCRIPTION OF THE DRAWINGS

The above and/or other aspects will become more apparent by describing certain exemplary embodiments with reference to the accompanied drawings in which:

FIG. 1 is a flowchart illustrating a process of transmitting data from a terminal to another device through near field communication (NFC) according to an exemplary embodiment;

FIG. 2 is a flowchart illustrating a process of transmitting data from a terminal to another device through NFC according to another exemplary embodiment;

FIG. 11 is a block diagram illustrating a schematic configuration of a terminal according to an exemplary embodiment.

DETAILED DESCRIPTION

Figure 3:
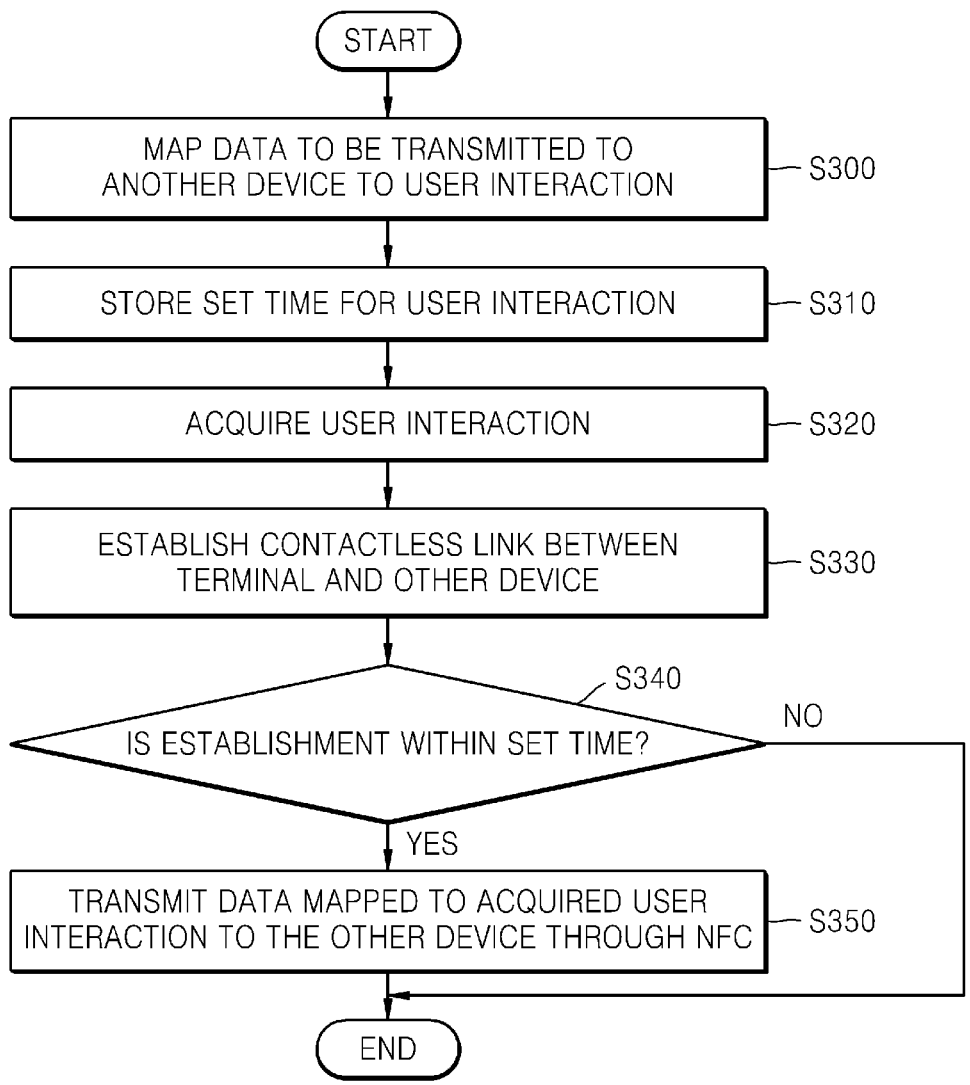
FIG. 3 is a flowchart illustrating a process of transmitting data from a terminal to another device through NFC according to a set time according to an exemplary embodiment.

Exemplary embodiments will be described below in detail with reference to the accompanying drawings so that those skilled in the art may easily implement the disclosure. The disclosure may, however, be embodied in many different forms and should not be construed as being limited to the embodiments set forth herein. In addition, portions irrelevant to the description of the disclosure will be omitted in the drawings for a clear description of the disclosure, and like reference numerals will denote like elements throughout the specification.

It will be understood that when an element is referred to as being "connected" to another element, it may be directly connected to the other element or may be indirectly connected to the other element with other element(s) interposed therebetween. It will also be understood that the terms "comprises", "includes", and "has", when used herein, specify the presence of stated elements, but do not preclude the presence or addition of other elements, unless otherwise defined.

Hereinafter, exemplary embodiments will be described in detail with reference to the accompanying drawings.

FIG. 1 is a flowchart illustrating a process of transmitting data from a terminal to another device through near field communication (NFC) according to an exemplary embodiment.

First, a terminal 800 (see FIG. 8) may map data to be transmitted to another device 810 (see FIG. 8) to a user interaction (S100). Herein, the user interaction may include information that may be input through an input device of the terminal 800. For example, the user interaction may include information that is generated through a motion recognition sensor (not shown) of the terminal 800. Herein, the motion recognition sensor may include one or more sensors such as, for example, an acceleration sensor and a gravity sensor for recognizing a motion of the terminal 800. As another example, the user interaction may include information about a fingerprint that is input to the terminal 800 through a fingerprint recognition device. As still another example, the user interaction may include information about a user's voice that is input to the terminal 800 through a microphone. In addition, the user interaction may be detected (e.g., acquired) through other input schemes provided in the terminal 800 such as, for example, face recognition and iris recognition.

In addition, the user interaction may include information that may be input through other input devices.

Also, according to an exemplary embodiment, the terminal 800 may store a result of mapping the user interaction and the data to be transmitted to the other device 810 in a storage medium (not shown). Herein, the storage medium may be a memory provided in the terminal 800 or a storage medium provided in a server that may communicate with the terminal 800. Also, the result of mapping the user interaction and the data to be transmitted to the other device 810 may be stored in a form of a table.

Also, according to an exemplary embodiment, the terminal 800 may be an electronic device including an NFC device. For example, the terminal 800 may be a personal computer (PC) or a mobile communication terminal such as, for example, a portable phone, a personal communication service (PCS) terminal, a personal digital assistant (PDA) terminal, or a notebook computer.

Also, according to an exemplary embodiment, the other device 810 may be a device for receiving data from the terminal 800 through NFC and providing a predetermined service to the terminal 800 by using the received data. For example, the other device 810 may a point-of-sale (POS) terminal for receiving payment information. As another example, the other device 810 may be an electronic lock device that receives an electronic key through the NFC and locks and/or unlocks according to the received electronic key. As still another example, the other device 810 may be substantially the same type of device as the terminal 800, which exchanges information through the NFC.

Also, according to an exemplary embodiment, the terminal 800 may cumulatively store a record about the user interaction and the data transmitted to the other device 810 through the NFC within a predetermined time from the user interaction. The terminal 800 may map the data to be transmitted to the other device 810 to the user interaction input to the terminal 800, based on the cumulatively-stored record.

For example, when a predetermined electronic key is repetitively transmitted a predetermined number of times or more each time information about a motion is sensed through a motion recognition sensor (not shown) of the terminal 800, the terminal 800 may map the sensed information about the motion and the transmitted electronic key.

Next, the terminal 800 may detect (e.g., acquire) the user interaction mapped to the data to be transmitted to the other device 810 (S110).

According to an exemplary embodiment, the terminal 800 may search for the acquired user interaction in a table that stores the result of mapping the user interaction stored in the storage medium and the data to be transmitted. The terminal 800 may select data mapped to the acquired user interaction from the search result.

For example, when the terminal 800 is a portable phone, an electronic key for a door lock installed at home may be mapped to a motion of turning the portable phone similar to turning a key. Herein, when a motion of turning the portable phone is sensed based on a recognized motion of the portable phone, a key for a door lock installed at home may be selected as data to be transmitted through the NFC.

Next, the terminal 800 may establish a contactless link using the NFC with the other device 810 (S120). The terminal 800 may communicate with the other device 810 through a contactless link that is established by using an NFC device provided in the terminal 800.

Next, according to the establishment of the contactless link, the terminal 800 may transmit the data mapped to the acquired user interaction to the other device 810 through the NFC (S130). Herein, the data mapped to the user interaction may be data that are selected according to the acquisition of the user interaction in operation S110.

According to an exemplary embodiment, the terminal 800 may receive a magnetic field emitted from the other device 810 through the NFC device of the terminal 800, and establish a contactless link for data communication with the other device 810. The terminal 800 may demodulate data from the received magnetic field. The terminal 800 may transmit data by modulating impedance of an antenna circuit included in the NFC device.

Also, according to an exemplary embodiment, the terminal 800 may transmit the acquired user interaction to the other device 810. For example, when fingerprint information is input to the terminal 800, the terminal 800 may transmit the fingerprint information to the other device 810.

Also, according to an exemplary embodiment, the terminal 800 may transmit the acquired user interaction to a predetermined server.

For example, in performing a payment service, when fingerprint information is input to the terminal 800, the terminal 800 may transmit the fingerprint information to a payment terminal or a predetermined server. The transmitted fingerprint information may be used to perform a payment process.

Also, according to an exemplary embodiment, in operation S100, the terminal 800 may map a predetermined text as a user interaction to data to be transmitted through the NFC. In operation S110, the terminal 800 may acquire voice information through voice recognition. The terminal 800 may generate a text from the voice information acquired through voice recognition. In operation S130, the terminal 800 may transmit data mapped to the text generated from the acquired voice information to the other device 810 through the NFC.

FIG. 2 is a flowchart illustrating a process of transmitting data from a terminal to another device through NFC according to another exemplary embodiment.

First, the terminal 800 may map data to be transmitted to the other device 810 to a user interaction (S200). Herein, the user interaction may include information that may be input through an input device of the terminal 800.

Next, the terminal 800 may establish a contactless link using the NFC with the other device 810 before acquiring the user interaction (S210).

According to an exemplary embodiment, the terminal 800 may receive data from the other device 810 through the NFC, and select the data to be transmitted to the other device 180 based on the received data. For example, when the other device 810 is an electronic lock device, the terminal 800 may receive an electronic key transmission request and identification information of the electronic lock device from the electronic lock device. The terminal 800 may select an electronic key to be transmitted through the NFC according to the identification information of the electronic lock device.

Next, the terminal 800 may acquire a user interaction (S220).

According to an exemplary embodiment, when data to be transmitted through the NFC is selected in operation S210, the terminal 800 may determine whether the user interaction mapped to the data in operation S200 is identical to the user interaction acquired in operation S220. When the user interaction mapped to the data in operation S200 is identical to the user interaction acquired in operation S220, the terminal 800 may transmit the data to the other device 810 through the NFC (S230). For example, the user interaction mapped to the data in operation S200 may be data including fingerprint information. In this case, when user interaction acquired in operation S220 is identical to the data including the fingerprint information mapped to the data in operation S200, the terminal 800 may transmit the data through the NFC.

According to another exemplary embodiment, the terminal 800 may select the data mapped to the acquired user interaction as the data to be transmitted through the NFC.

The terminal 800 may transmit the data mapped to the user interaction acquired in operation S220 to the other device 810 through the NFC (S230).

FIG. 3 is a flowchart illustrating a process of transmitting data from the terminal to the other device through NFC according to a set time according to an exemplary embodiment.

First, the terminal 800 may map data to be transmitted to the other device 810 to a user interaction (S300).

Next, the terminal 800 may store a set time for responding to the user interaction (S310). Herein, the set time may be a time between a time point at which the data mapped to the user interaction starts to be transmitted through the NFC and a time point at which the user interaction is acquired. For example, the terminal 800 may map fingerprint information to payment information and store a set time of about 10 seconds for the fingerprint information. The terminal 800 may transmit the payment information through the NFC when a time from the acquisition of the fingerprint information to the establishment of a contactless link using the NFC is within 10 seconds.

Next, the terminal 800 may acquire the user interaction mapped to the data to be transmitted to the other device 810 (S320) and establish the contactless link using the NFC with the other device 810 (S330).

Next, the terminal 800 may determine whether a time from the acquisition of the user interaction to the establishment of the contactless link using the NFC is within the set time (S340). When the time from the acquisition of the user interaction to the establishment of the contactless link using the NFC with the other device 810 is within the set time, the terminal 800 may transmit the data mapped to the acquired user interaction to the other device 180 through the NFC (S350).

Figure 4:
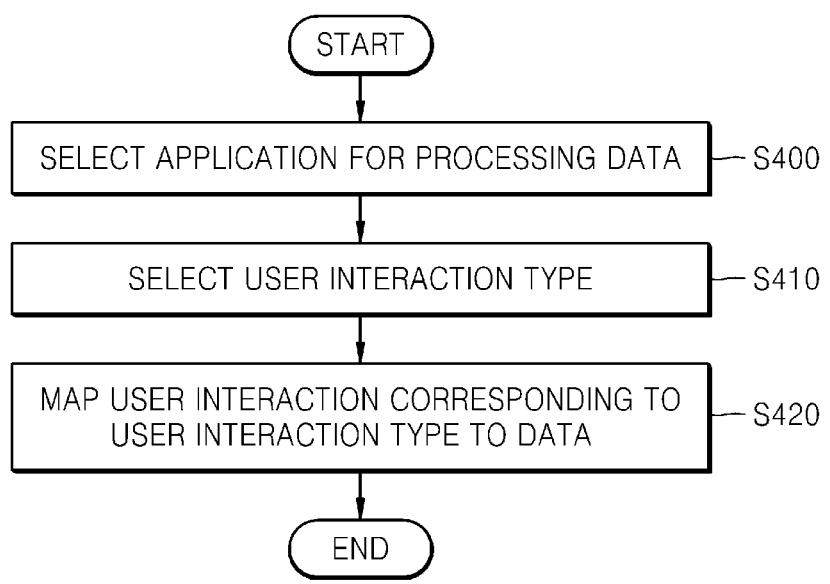
FIG. 4 is a flowchart illustrating a process of mapping a user interaction and data by a terminal according to an exemplary embodiment.

FIG. 4 is a flowchart illustrating a process of mapping a user interaction and data by a terminal according to an exemplary embodiment.

The terminal 800 may select an application for processing data (S400). Herein, the application may be used to perform a service provided by the terminal 800.

According to an exemplary embodiment, the terminal 800 may select data to be transmitted to the other device 810 according to the selected application.

For example, the terminal 800 may select a payment application for providing a payment service. The terminal 800 may select a payment means for performing the payment service according to the selection of the payment application. The terminal 800 may perform the payment service through the payment application. Data about the payment means transmitted to the other device 810 to perform the payment service may be managed through the payment application.

According to an exemplary embodiment, when acquiring the user interaction mapped to the data to be processed by a selected application, the terminal 800 may execute the selected application. The terminal 800 may process the data by using the executed application.

Next, the terminal 800 may select a user interaction type of the user interaction (S410). Herein, the user interaction type may be any user interaction type such as a fingerprint input, a voice input, or a recognized motion.

Next, the terminal 800 may map a user interaction corresponding to the selected user interaction type to the data (S420).

According to an exemplary embodiment, the terminal 800 may acquire a user interaction corresponding to the user interaction type selected in operation S410. For example, when a motion input among the user interaction types is selected in operation S410, the terminal 800 may acquire information generated through the motion recognition sensor (not shown). Next, the terminal 800 may map the acquired information to the data to be transmitted through the NFC.

Figure 5:
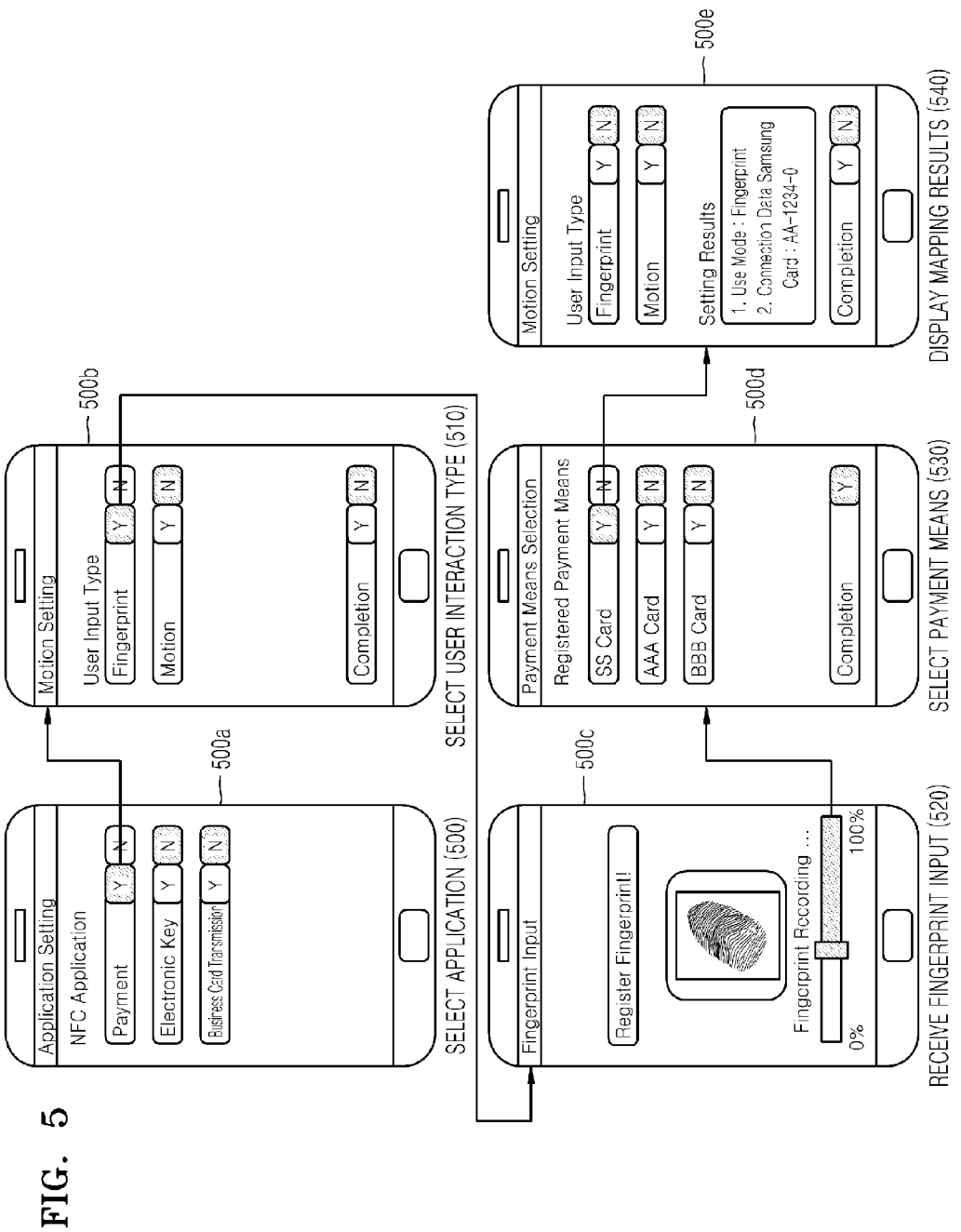
FIG. 5 is a diagram illustrating a user interface that is displayed on a screen of a terminal to map a user interaction and data to be transmitted according to an exemplary embodiment.

FIG. 5 is a diagram illustrating a user interface that is displayed on a screen of a terminal to map a user interaction and data to be transmitted according to an exemplary embodiment. FIG. 5 illustrates a user interface for mapping the data to be transmitted to the other device 810 to the user interaction in operation S100 or S200, as shown in FIG. 1 or FIG. 2.

According to an exemplary embodiment, the terminal 800 may display a list of applications for processing data on a user interface screen 500a of the terminal 800 and receive, from a user, selection of application from the displayed application list (500). According to an exemplary embodiment, a user of the terminal 800 may select any application among "Payment Application", "Electronic Key Application", and "Business Card Transmission Application" as illustrated in the user interface screen 500a shown in operation 500.

Also, according to an exemplary embodiment, the terminal 800 may display a list of user interaction types according to the selected application as shown in a user interface screen 500b of operation 510. The user of the terminal 800 may select any user interaction type among the displayed user interaction types (510). When "Fingerprint" is selected among the displayed user interaction types, the terminal 800 may display a user interface screen 500c for receiving a fingerprint input. Then, the terminal 800 may receive a fingerprint input through the user interface screen 500c (520).

Also, according to an exemplary embodiment, when the fingerprint information is input, the terminal 800 may display a list of payment means according to the selection of "Payment Application" in operation 500 as shown in a user interface screen 500d of operation 530. When any payment means is selected among the displayed payment means (530), the terminal 800 may map information about the fingerprint input in operation 520 and information about the payment means selected in operation 530. The terminal 800 may display a result of mapping the information about the fingerprint and the information about the payment means in a user interface screen 500e (540).

Figure 6:
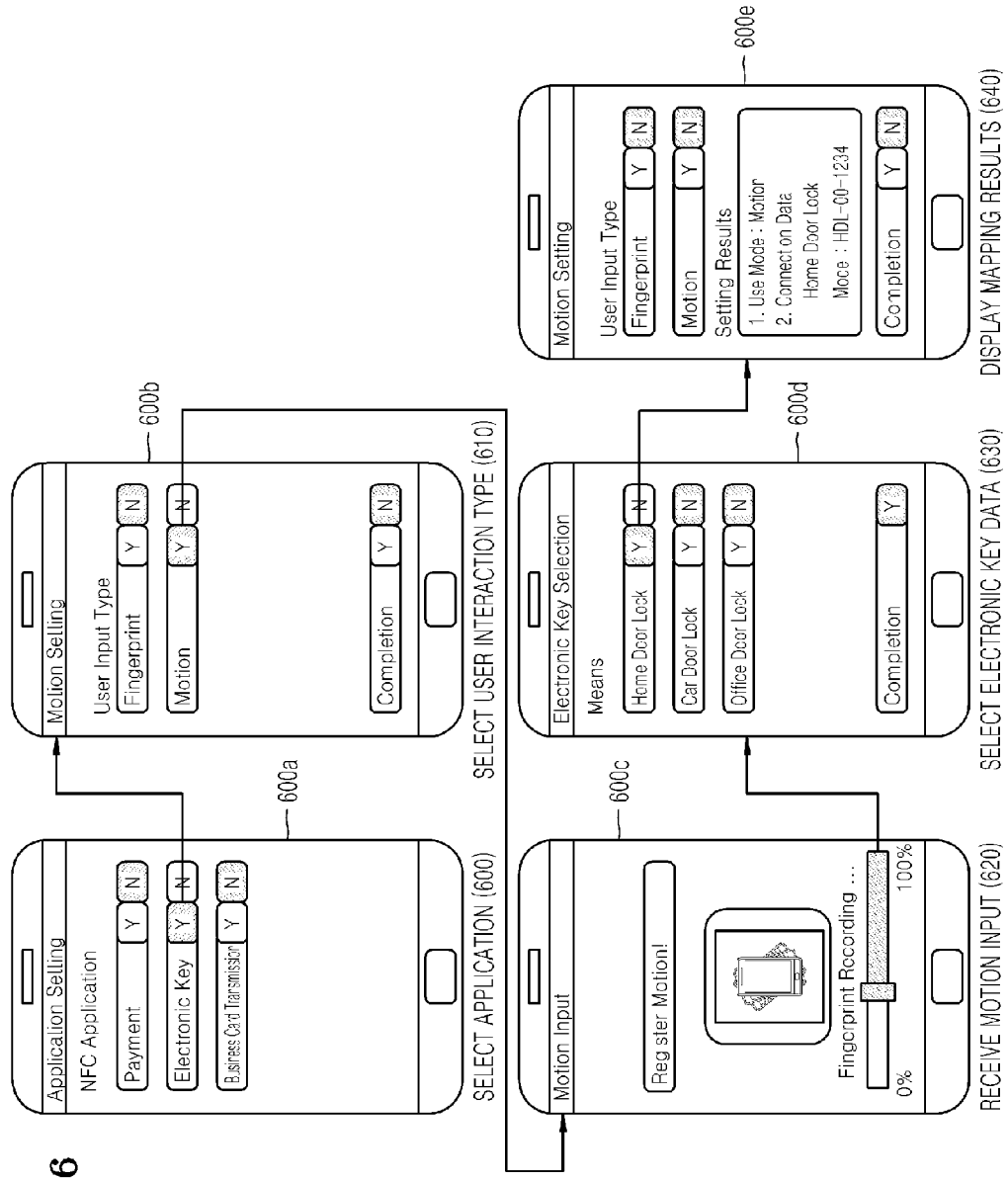
FIG. 6 is a diagram illustrating a user interface that is displayed on a screen of a terminal to map a user interaction and data to be transmitted according to another exemplary embodiment.

FIG. 6 is a diagram illustrating a user interface that is displayed on a screen of a terminal to map a user interaction and data to be transmitted according to another exemplary embodiment. FIG. 6 illustrates a user interface for mapping the data to be transmitted to the other device 810 to the user interaction in operation S100 or S200 as shown in FIG. 1 or FIG. 2.

According to an exemplary embodiment, "Electronic Key Application" may be selected among an application list displayed in a user interface screen 600a of the terminal 800 (600). When the "Electronic Key Application" is selected, the terminal 800 may display a list of user interaction types as shown in a user interface screen 600b (610).

Also, when "Motion" is selected among the user interaction type list (610), the terminal 800 may display a user interface screen 600*c* for receiving an input through, for example, a motion recognition sensor of the terminal 800 as shown in 620.

When receiving the information generated through the motion recognition sensor (620), the terminal 800 may display a list of electronic key data corresponding to the "Electronic Key Application" in a user interface screen 600*d* as shown in 630. When an electronic key is selected through the user interface screen 600*d* displaying the list of electronic key data (630), the terminal 800 may map the information generated through the motion recognition sensor and the selected electronic key data. Also, the terminal 800 may display a result of mapping the information generated through the motion recognition sensor and the selected electronic key data in a user interface screen 600*e* (640).

Figure 7:
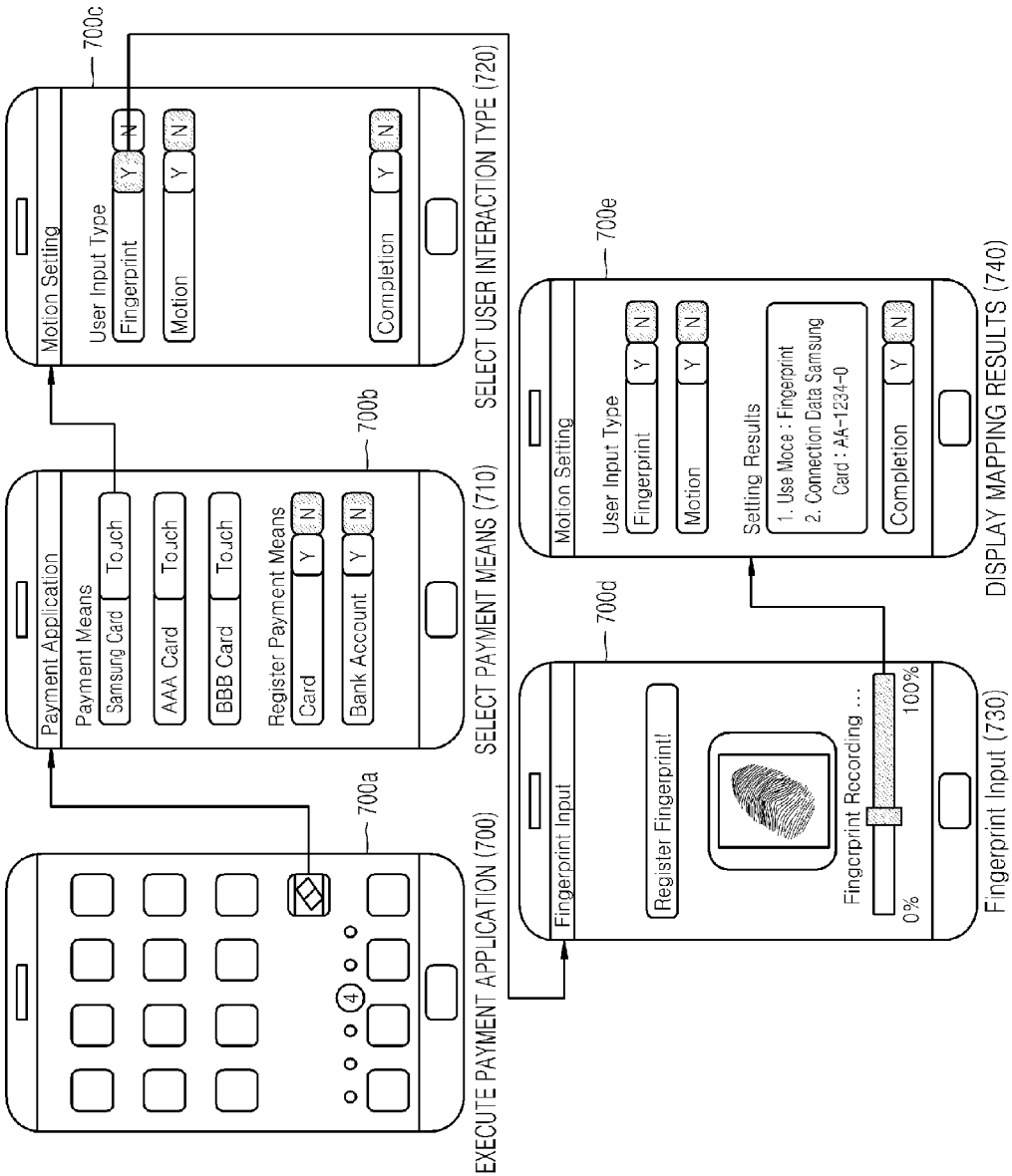
FIG. 7 is a diagram illustrating a user interface that is displayed on a screen of a terminal to map a user interaction and data to be transmitted according to still another exemplary embodiment.

FIG. 7 is a diagram illustrating a user interface that is displayed on a screen of a terminal to map a user interaction and data to be transmitted according to still another exemplary embodiment. FIG. 7 illustrates a user interface for mapping the data to be transmitted to the other device 810 to the user interaction, in operation S100 or S200 as shown in FIG. 1 or FIG. 2.

According to an exemplary embodiment, the terminal 800 may execute a payment application installed in the terminal 800 in a user interface screen 700*a* (700) and display a user interface screen 700*b* for selecting a payment means as shown in 710. When the payment means is selected (710), the terminal 800 may display a user interface screen 700*c* for selecting a user interaction type as shown in 720. When "Fingerprint" is selected among the user interaction types (720), fingerprint information may be input to the terminal 800 in a user interface screen 700*d* (730), the fingerprint information is mapped to the data about the selected payment means, and a mapping result thereof may be displayed in a user interface screen 700*e* (740).

The user interfaces of the terminal 800 illustrated in FIGS. 5 to 7 are for illustration only and are not limiting. Also, screen configurations and a sequence of the user interfaces displayed in the terminal 800 may vary according to exemplary embodiments.

Figure 8:
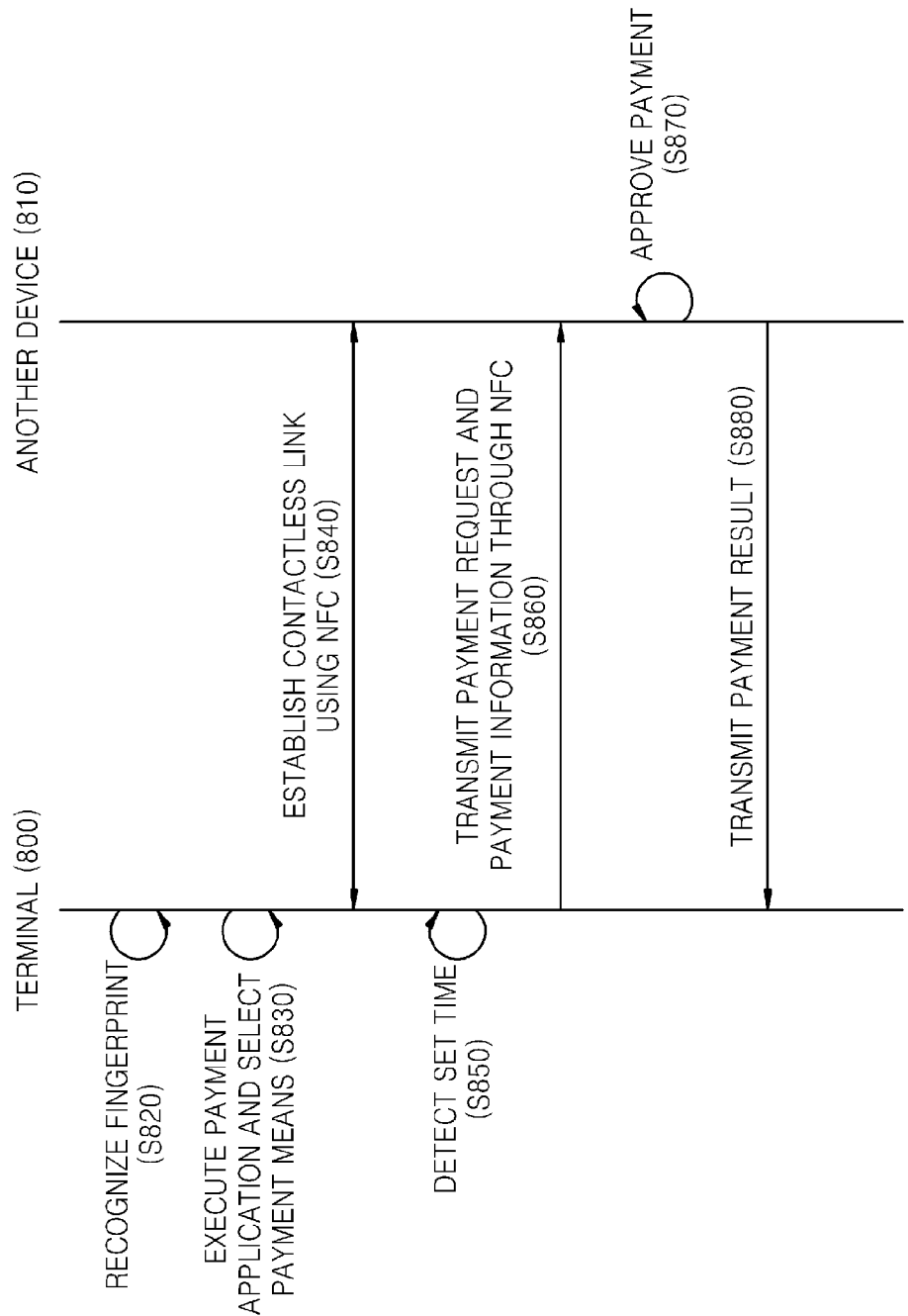
FIG. 8 is a flowchart illustrating a process of performing a payment service through NFC between a terminal and another device according to an exemplary embodiment.

FIG. 8 is a flowchart illustrating a process of performing a payment service through NFC between a terminal and another device according to an exemplary embodiment. FIG. 8 illustrates a detailed process of acquiring a user interaction and transmitting data mapped to the user interaction to the other device 810 through the NFC when a contactless link is established between the terminal 800 and the other device 810 according to an exemplary embodiment. Hereinafter, for illustrative purposes, a case where a payment application is selected and executed in the terminal 800 is described.

The terminal 800 may recognize fingerprint information through a fingerprint recognition sensor (not shown) as the user interaction (S820). The terminal 800 may select data to be mapped to the acquired fingerprint information and execute an application for processing the selected data (S830). Herein, the fingerprint information is mapped to information about a payment means, and the application for processing data may be the payment application. Herein, the terminal 800 may be a portable phone capable of near field communication, and the other device 810 may a payment terminal.

A contactless link using the NFC may be established between the terminal 800 and the other device 810 (S840). When the contactless link is established, the terminal 800 may detect a set time for responding to the fingerprint information stored in operation S310 (S850). Also, the terminal 800 may determine whether a time from recognition of the fingerprint in operation S820 to establishment of the contactless link is within the set time.

Next, when the time from the recognition of the fingerprint in operation S820 to the establishment of the contactless link is within the set time, the terminal 800 may transmit a payment request and payment information including data about the payment means (S860).

Next, the other device 810 may approve payment according to the received payment request and payment information (S870). Herein, according to an exemplary embodiment, the other device 810 may transmit the payment information to a separate server and receive information about approval or disapproval of the payment from the separate server.

Next, the other device 810 may transmit a payment result to the terminal 800 through the NFC (S880).

Figure 9:
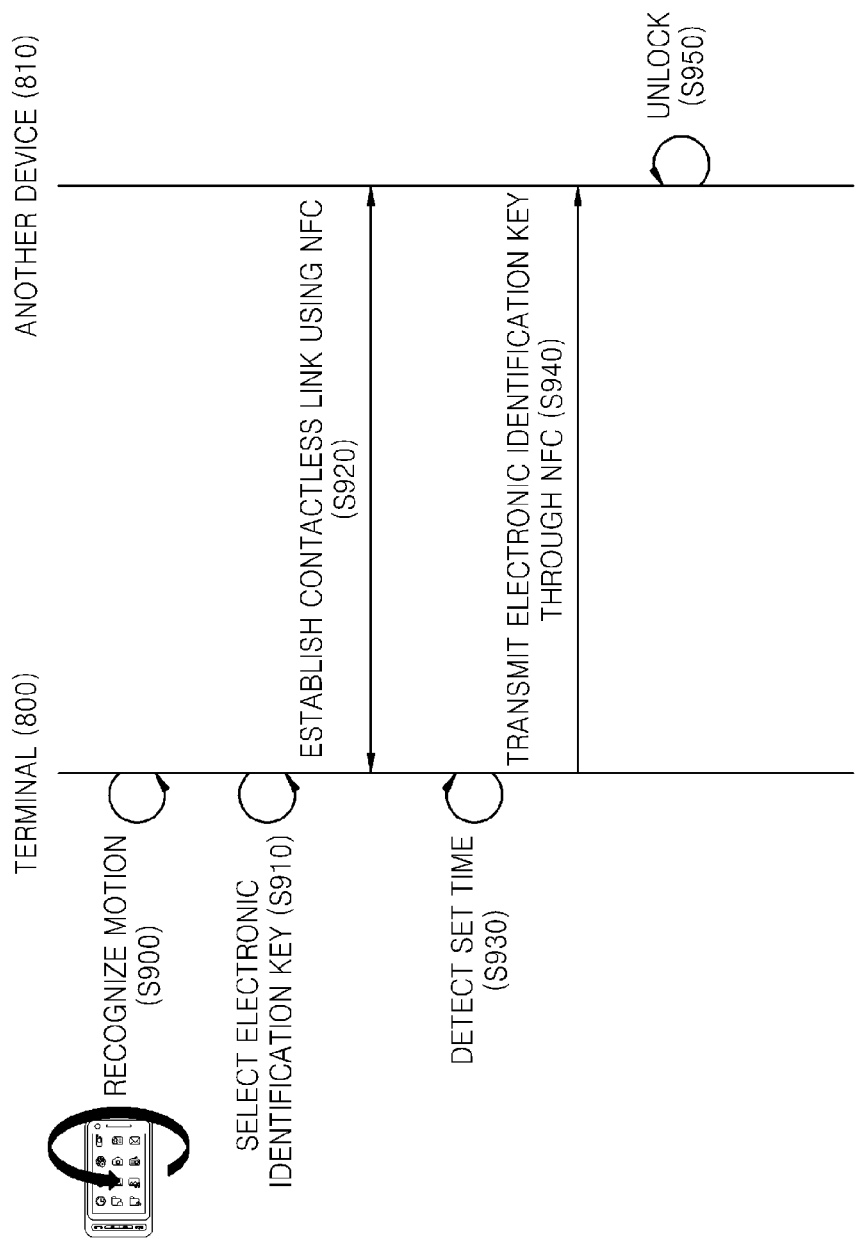
FIG. 9 is a flowchart illustrating a process of transmitting an electronic key through NFC between a terminal and another device according to an exemplary embodiment.

FIG. 9 is a flowchart illustrating a process of transmitting an electronic key through NFC between a terminal and another device according to an exemplary embodiment. FIG. 9 illustrates a detailed process of acquiring a user interaction and transmitting data mapped to the acquired user interaction to the other device 810 through the NFC when a contactless link is established between the terminal 800 and the other device 810 according to an exemplary embodiment. Hereinafter, for illustrative purposes, a case where an electronic key application is selected executed in the terminal 800 is described.

The terminal 800 may recognize a motion of the terminal 800 (S900). The terminal 800 may acquire information generated through the motion recognition sensor (not shown) of the terminal 800 as the user interaction. For example, when the user rotates the terminal 800 by a certain degree, information may be generated through the motion recognition sensor according to a rotating gesture. Next, the terminal 800 may select data, for example, an electronic identification key mapped to the information generated through the motion recognition sensor (910). Herein, the terminal 800 may be a mobile communication terminal capable of near field communication.

Next, a contactless link using the NFC is established with the other device 810 (S920), and the terminal 800 may detect the set time set in operation S310 of FIG. 3 with respect to the information generated through the motion recognition sensor (S930). The terminal 800 may determine whether a time from generation of the information though the motion recognition sensor to establishment of the contactless link using the NFC with the other device 810 is within the set time. Herein, the other device 810 may be an electronic lock device that may lock or unlock a lock device thereof by using an electronic identification key.

Next, when the time from the generation of the information though the motion recognition sensor to the establishment of the contactless link using the NFC with the other device 810 is within the set time, the terminal 800 may transmit the electronic identification key selected in operation S910 through the NFC (S940).

When receiving the electronic identification key through the NFC, the other device 810 may unlock the lock device thereof (S950).

Figure 10:
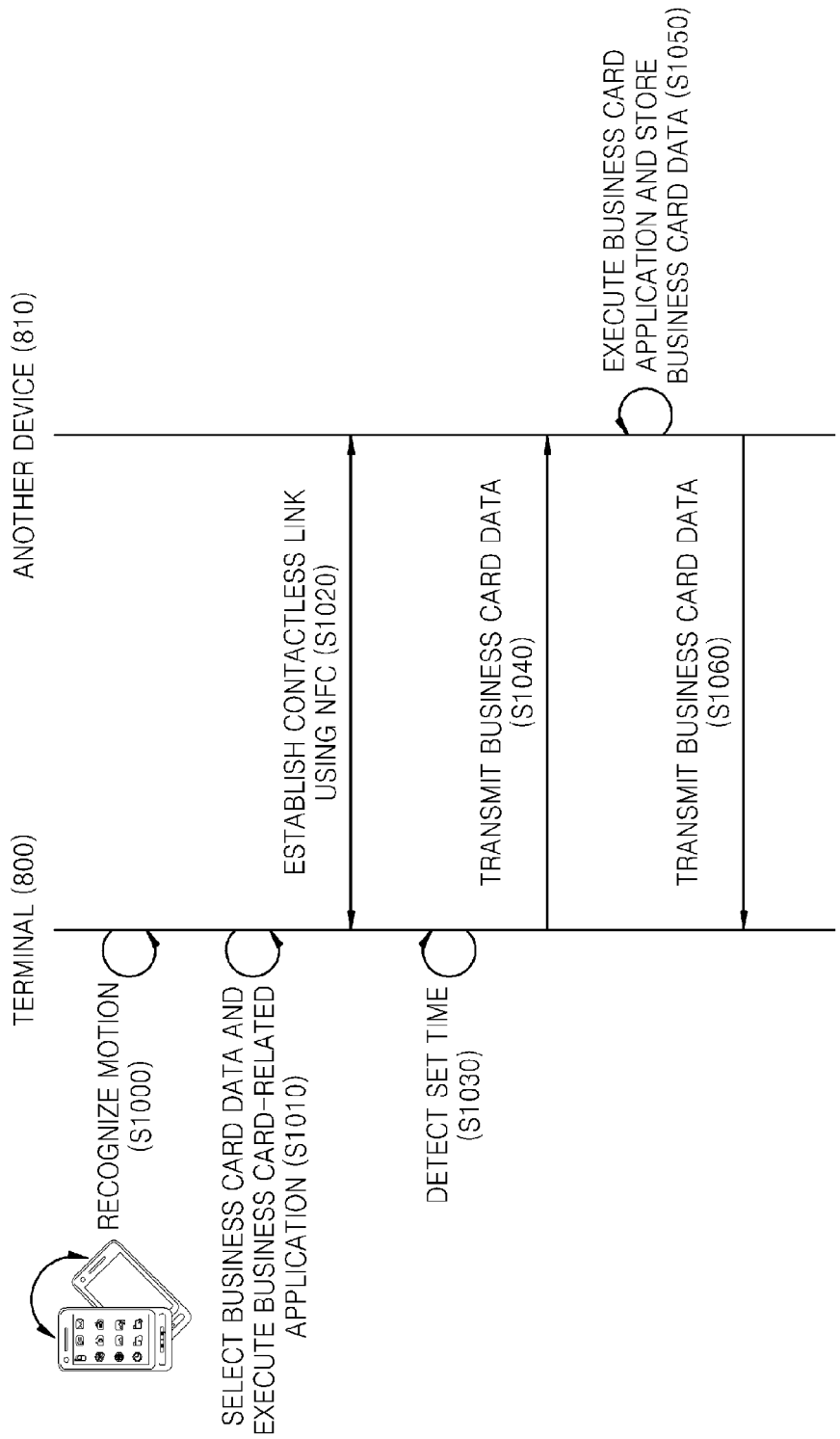
FIG. 10 is a flowchart illustrating a process of performing a business card exchange service between a terminal and another device according to an exemplary embodiment.

FIG. 10 is a flowchart illustrating a process of performing a business card exchange service between a terminal and another device, according to an exemplary embodiment. FIG. 10 illustrates a detailed process of acquiring a user interaction and transmitting data mapped to the user interaction to the other device 810 through the NFC when a contactless link is established between the terminal 800 and the other device 810 according to an exemplary embodiment. Hereinafter, for illustrative purposes, a case where a business card-related application (e.g., a business card transmission application) is selected executed in the terminal 800 is described.

The terminal 800 may recognize a motion of the terminal 800 (S1000). The terminal 800 may acquire information generated through the motion recognition sensor of the terminal 800 as the user interaction. For example, when the user shakes the terminal 800, information may be generated through the motion recognition sensor according to a shaking gesture of the user. Herein, the terminal 800 may be a mobile communication terminal capable of near field communication.

Next, the terminal 800 may select business card data mapped to the information generated through the motion recognition sensor and execute a business card-related application for processing the business card data (1010). Next, a contactless link using the NFC is established with the other device 810 (S1020), the terminal 800 may detect the set time set in operation S310 with respect to the information generated through the motion recognition sensor (S1030). The terminal 800 may determine whether a time from the generation of the information though the motion recognition sensor to the establishment of the contactless link using the NFC with the other device 810 is within the set time. Herein, the other device 810 may be a mobile communication terminal capable of near field communication.

Next, when the time from the generation of the information though the motion recognition sensor to the establishment of the contactless link using the NFC with the other device 810 is within the set time, the terminal 800 may transmit the business card data selected in operation S1010 through the NFC by using the business card-related application (S1040).

When receiving the business card data, the other device 810 may execute the business card application and store the received business card data (S1050). Next, the other device 810 may transmit the business card data stored in the other device 810 to the terminal 800 through the NFC (S1060).

FIG. 11 is a block diagram illustrating a schematic configuration of a terminal according to an exemplary embodiment.

According to an exemplary embodiment, the terminal 800 may include a setting unit 1110 that maps data to be transmitted to the other device 810 to a user interaction acquired on the terminal 800; an input unit 1120 that acquires a user interaction input to the terminal 800; an NFC unit 1130 that transmits the data mapped to the acquired user interaction to the other device 810 through the NFC; and a controller 1100 that controls the aforementioned elements.

According to an exemplary embodiment, the setting unit 1110 may store a table, including a result of mapping the data to be transmitted to the other device 810 and the user interaction input to the terminal 800, in a storage 1140.

Also, according to an exemplary embodiment, the setting unit 1110 may store a set time for the user interaction. Herein, the terminal 800 may determine whether to transmit the data through the NFC according to the set time. That is, the terminal 800 may determine whether to transmit the data through the NFC, according to whether the time from the acquisition of the user interaction to the establishment of the contactless link using the NFC with the other device 810 is within the set time.

Also, according to an exemplary embodiment, the setting unit 1110 may include an application selecting unit 1113 that selects an application for processing the data to be transmitted through the NFC; a data selecting unit 1111 that selects the data to be transmitted to the other device 810; and a mapping unit 1112 that maps the selected data to the user interaction input to the terminal 800.

Herein, when the input unit 1120 acquires the user interaction, the application selecting unit 1113 may select an application for processing the data mapped to the acquired user interaction. The controller 1100 may execute the application selected by the application selecting unit 1113. For example, the controller 110 may be a central processing unit (CPU).

Also, the mapping unit 1112 may select a user interaction type of the user interaction to be mapped to the data. For example, the mapping unit 1112 may select a user interaction such as "Fingerprint input" or "Motion of terminal" through, for example, the user interface screen 500*b* illustrated in operation 510 as shown in FIG. 5. Also, the mapping unit 1112 may acquire the user interaction according to the selected user interaction type. For example, when "Fingerprint input" is selected in operation 510, the mapping unit 1112 may receive an input of fingerprint information as shown in operation 520 of FIG. 5. Also, the mapping unit 1112 may map the acquired user interaction to the data selected by the data selecting unit 1113.

According to an exemplary embodiment, the input unit 1120 may acquire the user interaction input to the terminal 800. By selecting the data to be transmitted through the NFC based on the user interaction acquired through the input unit 1120, the terminal 800 may provide the user with a service suitable for the user according to the user's intention.

Also, according to an exemplary embodiment, the input unit 1120 may include a motion recognition sensor 1121. Herein, the motion recognition sensor 1121 may include one or more sensors such as, for example, an acceleration sensor and a gravity sensor for recognizing a motion of the terminal 800. The input unit 1120 may generate a user interaction including the information generated through the motion recognition sensor 1121. For example, the input unit 1120 may generate a user interaction including information generated when a user's motion of rotating the terminal 800 is sensed through the motion recognition sensor 1121.

Also, according to an exemplary embodiment, the input unit 1120 may include a microphone 1122 for receiving a voice input. The terminal 800 may acquire a user interaction including voice information input through the microphone 1122.

Also, according to an exemplary embodiment, the input unit 1120 may include a fingerprint input unit 1123 for acquiring fingerprint information. The fingerprint input unit 1123 may include a fingerprint recognition sensor (not shown). The terminal 800 may acquire a user interaction including the fingerprint information input through the fingerprint input unit 1123.

According to an exemplary embodiment, the NFC unit 1130 may include an NFC device and perform near field communication with the other device 810. When the user interaction is acquired through the input unit 1120, the NFC unit 1130 may transmit the data mapped to the user interaction by the setting unit 1110 to the other device 810 through the NFC.

Also, according to an exemplary embodiment, the NFC unit 1130 may transmit the user interaction to the other device 810 through the NFC. For example, when the user interaction is fingerprint information, the NFC unit 1130 may transmit the fingerprint information to the other device 810 which is, for example, a payment terminal. The payment terminal may be used for authentication for payment processing of the fingerprint information.

According to an exemplary embodiment, the storage 1140 may store the result of mapping the data to be transmitted to the other device 810 and the user interaction input to the terminal 800 by the setting unit 1110. The storage 1140 may store the mapping result in the form of a table. For example, the storage 1149 may be a memory.

According to an exemplary embodiment, the setting unit 1110 may map the data to be transmitted to the other device 810 to the user interaction. Herein, the user interaction may be a text. Also, the input unit 1120 may acquire voice information through the microphone of the terminal 800. The input unit 1120 may generate a text from the voice information acquired through voice recognition, and acquire the generated text as the user interaction. The NFC unit 1130 may transmit data mapped to the text generated from the voice information through the NFC.

Exemplary embodiments may be implemented in a computer-readable recording medium including instructions executable by a computer, such as a program module executed by a computer. The computer-readable recording medium may be any available medium accessible by computers, examples of which may include a volatile recording medium, a nonvolatile recording medium, a removable recording medium, and an unremovable recording medium. Examples of the computer-readable medium may also include a computer storage medium and a communication medium. Examples of the computer storage medium may include a volatile storage medium, a nonvolatile storage medium, a removable storage medium, and an unremovable storage medium that are implemented by any method or technology to store information such as computer-readable instructions, data structures, program modules, or other data. Examples of the communication medium may include any information transmission medium including computer-readable instructions, data structures, program modules, other data of modulated data signals such as carrier waves, or other transmission mechanisms.

The foregoing is illustrative of exemplary embodiments and is not to be construed as limiting thereof. Although the exemplary embodiments have been described above, those skilled in the art will readily appreciate that various modifications are possible in the exemplary embodiments without materially departing from the novel teachings and advantages of the exemplary embodiments. Therefore, it is to be understood that the exemplary embodiment described above should be considered in descriptive sense only and not for purposes of limitation. For example, the components described as being combined may also be implemented in a distributed manner, and the components described as being distributed may also be implemented in a combined manner. Therefore, the scope of the disclosure is defined not by the detailed description of the disclosure but by the appended claims, and all modifications or differences within the scope should be construed as being included in the disclosure.

What is claimed is:

1. A method of transmitting data in a terminal capable of near field communication (NFC), comprising:
   selecting a user interaction type of a user interaction, from among a plurality of types of user interactions that are detectable by different types of input units of the terminal;
   detecting a user interaction input to the terminal, wherein the detected user interaction corresponds to the selected user interaction type;
   storing a record of previous transmission of data through the NFC within a predetermined time from a time point when a user interaction of a certain type is detected;
   determining predetermined data mapped to the detected user interaction, based on a predetermined number or more of previous transmissions of the predetermined data through the NFC within the predetermined time from a time point when the user interaction of the selected user interaction type is detected; and
   transmitting the data mapped to the detected user interaction to another device through the NFC.

2. The method of claim 1, further comprising storing the predetermined time that is set for transmission of the predetermined data mapped to the detected user interaction,
   wherein the transmitting comprises transmitting the predetermined data mapped to the detected user interaction to the other device through the NFC when a contactless link is established between the terminal and the other device using the NFC within the predetermined time from the time point when the user interaction of the selected user interaction type is detected.

3. The method of claim 1, wherein the plurality of types of user interaction comprises a motion of a user recognized through a motion recognition sensor of the terminal.

4. The method of claim 1, wherein the plurality of types of user interaction comprises a fingerprint of a user input to the terminal.

5. The method of claim 1, wherein the plurality of types of user interaction comprises a voice of a user input to the terminal.

6. The method of claim 5, wherein the determining comprises generating a text through voice recognition of the voice of the user, input to the terminal, and determining predetermined data mapped to the generated text.

7. The method of claim 1, further comprising, prior to the determining:
   selecting an application for processing the predetermined data; and
   mapping the predetermined data to the detected user interaction to be transmitted to the other device according to the selected application.

8. The method of claim 1, further comprising transmitting information about the user interaction to the other device.

9. A terminal, comprising at least one hardware processor:
   an input unit configured to receive an input of a selection of a type a user interaction, from among a plurality of types of user interactions that are detectable by different types of input units of the terminal;
   a near field communication (NFC) unit configured to perform near field communication (NFC) with another device;
   a controller configured to detect the user interaction that is input to the terminal, and control the NFC unit to transmit predetermined data mapped to the detected user interaction to the other device through the NFC;
   a storage configured to store a record of previous transmission of data through the NFC within a predetermined time from a time point when the user interaction of a certain type is detected; and
   a mapping unit configured to map the predetermined data to the detected user interaction when the detected user interaction corresponds to the selected type of the user interaction,
   wherein the mapping unit is configured to map the predetermined data to the detected user interaction, based on a predetermined number or more of previous transmission of the predetermined data through the NFC within the predetermined time from a time point when the user interaction of the selected type is detected.

10. The terminal of claim 9, wherein the controller controls the NFC unit to transmit the predetermined data mapped to the detected user interaction to the other device through the NFC when a contactless link is established between the terminal and the other device using the NFC within the predetermined time from the time point when the user interaction of the selected type is detected.

11. The terminal of claim 9, wherein the input unit comprises a motion recognition sensor, and the plurality of types of user interaction comprises a motion of a user input through the motion recognition sensor of the terminal.

12. The terminal of claim 9, wherein the input unit comprises a fingerprint recognition sensor, and the plurality of types of user interactions comprise a fingerprint of a user input through the fingerprint recognition sensor.

13. The terminal of claim 9, wherein the input unit comprises a microphone for voice recognition, and the plurality of types of user interactions comprises voice information of a user input through the microphone.

14. The terminal of claim 13, wherein the input unit generates a text through voice recognition of the voice information of the user input to the terminal and the controller transmits predetermined data mapped to the generated text to the other device.

15. The terminal of claim 9, further comprising a setting unit comprising:
    an application selecting unit configured to select an application for processing the predetermined data, and wherein
    the mapping unit is configured to map the predetermined data to the detected user interaction to be transmitted to the other device according to the selected application.

16. The terminal of claim 9, wherein the NFC unit transmits the user interaction, together with the predetermined data, to the other device through the NFC.

17. A non-transitory computer-readable recording medium having embodied thereon at least one program comprising a command for performing a method of providing recommendation information using a display apparatus, the method comprising:
    selecting a user interaction type of a user interaction, from among a plurality of types of user interactions that are detectable by different types of input units of the terminal;
    storing a record of previous transmission of data through the NFC within a predetermined time from a time point when the user interaction of a certain type is detected;
    detecting a user interaction input to the terminal, wherein the user interaction corresponds to the selected user interaction type;
    determining predetermined data mapped to the detected user interaction, based on a predetermined number or more of previous transmissions of the predetermined data through the NFC within the predetermined time from a time point when the user interaction of the selected user interaction type is detected; and
    transmitting the predetermined data mapped to the detected user interaction to another device through the NFC.

* * * * *